(12) United States Patent
Takahashi

(10) Patent No.: US 6,985,629 B2
(45) Date of Patent: Jan. 10, 2006

(54) IMAGE PROCESSING METHOD, RELATIVE DENSITY DETECTING METHOD AND IMAGE PROCESSING APPARATUS

(75) Inventor: Hiroyasu Takahashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 09/841,932

(22) Filed: Apr. 25, 2001

(65) Prior Publication Data

US 2002/0021839 A1 Feb. 21, 2002

(30) Foreign Application Priority Data

Apr. 26, 2000 (JP) ........................................ 2000-126707

(51) Int. Cl.
*G06K 9/62* (2006.01)

(52) U.S. Cl. ........................ 382/225; 358/2.1; 382/307
(58) Field of Classification Search ................ 382/169, 382/173–177, 225, 226, 228, 237, 252, 270, 382/276, 307, 162, 163, 164, 166, 171, 190, 382/193, 217, 218; 358/2.1, 2.99, 464, 450, 358/474
See application file for complete search history.

(56) References Cited

U.S. PATENT DOCUMENTS

| | | | | | |
|---|---|---|---|---|---|
| 4,841,374 | A | * | 6/1989 | Kotani et al. | 382/237 |
| 5,680,477 | A | * | 10/1997 | Asada | 382/169 |
| 5,761,344 | A | * | 6/1998 | Al-Hussein | 382/237 |
| 6,167,154 | A | * | 12/2000 | Renaud et al. | 382/174 |
| 6,507,415 | B1 | * | 1/2003 | Toyoda et al. | 358/450 |
| 6,631,210 | B1 | * | 10/2003 | Mutoh et al. | 382/176 |

FOREIGN PATENT DOCUMENTS

JP PUPA5-300369 11/1993

* cited by examiner

*Primary Examiner*—Bhavesh M. Mehta
*Assistant Examiner*—Abolfazl Tabatabai
(74) *Attorney, Agent, or Firm*—Ido Tuchman; Louis P. Herzberg

(57) ABSTRACT

To cut out a character and the like which are relatively darker than a background and are written with a pen and so on at a high speed, to use the cutting-out of a character and the like as pre-processing for character recognition, and to emphasize an object so as to hardly damage determinability of a character, a figure and the like to binarize the same. Attention is paid to that a character written with a pen and so on is relatively darker than a background, and a relative density of the character to a periphery thereof is obtained to binarize the same, thus emphasizing an object such as a character.

16 Claims, 9 Drawing Sheets

$$[P]_{mn} = C + \alpha P_{mn}$$
$$+ \beta \{ 2P_{mn} - (S_{ij} + d_1 S_{i-1j} + d_4 S_{i+1j})$$
$$+ 2P_{mn} - (S_{ij} + d_2 S_{ij-1} + d_3 S_{ij+1}) \}/4$$

Add Absolute Value
Add Relative Value
Itself, On And Under
Itself, Left And Right

[P]mn: Final Value Of Pixel In m-TH Column And j-TH Tow

Pmn: Value (Absolute Value) Of Pixel In m-TH Column And n-TH Row

C: Constant

Sij: Average Density Of Mesh In i-TH Column And j-TH Row

α: Weight Coefficient Of Absolute Value

β: Weight Coefficient Of Relative Value $d_1$: Weight Coefficient Of Mesh On Mesh To Which Watched Pixel Belongs $d_2$: Weight Coefficient Of Mesh At Left Of Mesh To Which Watched Pixel Belongs $d_3$: Weight Coefficient Of Mesh At Right Of Mesh To Which Watched Pixel Belongs $d_4$: Weight Coefficient Of Mesh Under Mesh To Which Watched Pixel Belongs

Fig. 3

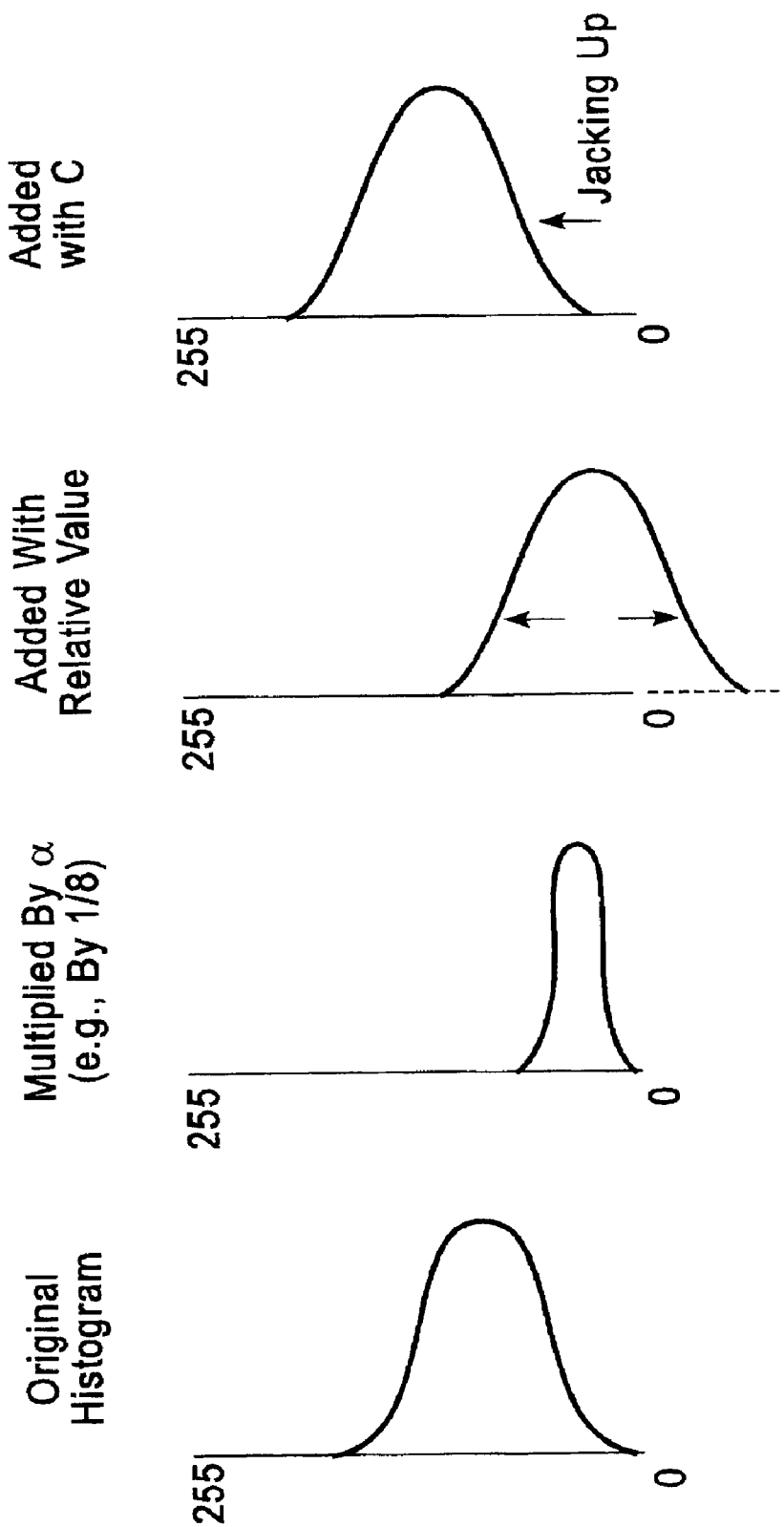

IMAGE PROCESSING METHOD, RELATIVE DENSITY DETECTING METHOD AND IMAGE PROCESSING APPARATUS

FIELD OF THE INVENTION

The present invention relates to an image processing method and an apparatus thereof, which binarize a multi-valued image having depth, more particularly to an image processing method and an apparatus thereof, which exert performance for cutting out characters and the like.

BACKGROUND OF THE INVENTION

Recent years, a digital camera and so on have been developed, thus a request has been increased such that a large number of images, each of which includes a large number of character images such as those on a white board used at a conference and on a time table, should be taken into photographs and stored, and later, character information and the like should be read out from the photograph information. Such a photograph image by a digital camera is a multi-valued image having depth. If image information of the multi-valued image is stored as it is and outputted according to needs, it is possible to read out the character information and the like from the photograph information of the multi-valued image.

However, the multi-valued image has a large amount of information, and storing the image information requires an enormous amount of memories. For a request to simply read a character, it is not preferable that the multi-valued image is stored in memories as it is, and it is desirable that this multi-valued image is binarized to be stored in the memories. Such binarization of a multi-valued image having a depth is required for not only the foregoing example but also various other applications. For example, the binarization is required for the case where an image is reduced in size to be stored, the case of performing pre-processing made for recognizing an object in an image such as a character, the case of obtaining a special image processing effect (such as a woodcut print image) and so on. As principal binarization methods, there have conventionally existed a simple binarization method, an edge emphasis binarization method, a binarization method designed to pursue photograph quality as much as possible by using a binary printer driver program and so on.

Moreover, in a gazette of Japanese Patent Laid-Open No. Sho 63-108470, in consideration of a defect that the sphere of characters or figures whose binarized images may be sufficient is stored as multi-valued data, a technology is disclosed, in which information for classifying spheres into respective spheres to be saved as binary data and multi-valued data is added to image data and stored, thus the image data is stored in a small volume. Furthermore, in a gazette of Japanese Patent Laid-Open No. Hei 5-225388, a technology is disclosed, in which each pixel is filtered depending on a change of image densities of pixels existing on a periphery thereof to smoothen and thin image data, thus pre-processing is executed for enhancing clearness of an image to perform character recognition and so on.

However, the simple binarization method as described above is hardly used actually, though it is very simple. For example, if in an image, there are dark and bright portions that are mixed with each other, it often occurs that a density of a character existing in the bright portion is brighter than a background in the dark portion. For this reason, with this simple binarization method, there remain unsolved problems that an outline of a character or an object in the bright portion or the like is faded and that an outline of a character or an object in the dark portion or the like turns solid black together with a background. Moreover, the edge emphasis binary method cannot deal with a character having, for example, a blurred outline, therefore this method cannot be used for character recognition and the like. Furthermore, the binarization method designed to pursue photograph quality as much as possible by using a binary printer driver program provides the most natural image exhibiting good quality when viewed as a photograph by a person, but this method is not suitable for character recognition and cannot be used for the purpose of reducing a data volume to a great extent. Furthermore, in the prior arts described in the gazettes of Japanese Patent Laid-Open No. Sho 63-108470 and Hei 5-225388, a calculation amount is enormous and image processing to a great extent is required. Accordingly, the image processing using the binarization methods cannot be achieved with a simple system constitution by these prior arts, and it is difficult to attain high-speed processing therewith.

SUMMARY OF THE INVENTION

The present invention was made in order to solve the forgoing technical subjects. An aspect of the present invention is to provide an image processing apparatus, which cut out, for example, a character and the like written with a pen and so on, the character being relatively darker than a background, at a high speed.

Another aspect of the present invention is to provide an image processing apparatus and the like, which emphasize an object without performing character recognition to compress an image size without damaging understandability of the object.

It is still another aspect of the present invention to obtain binary data, which has a small number of step differences and is smooth and high quality, even in the case where a background density is referred in an attempt of high-speed processing.

In order to achieve the foregoing aspects, according to the present invention, an image processing system used for pre-processing for cutting out a character and the like is provided, in which attention is paid to that a character written with a pen and so on is relatively darker than a background, a relative density of such a character to a periphery thereof is obtained and then the obtained relative density is binarized, and thus an object such as a character is emphasized and a background is brightened. Specifically, an image processing method, to which the present invention is applied, comprises the steps of: meshing an inputted image into sub images, each of which has a specified size and, for example, has a rectangular area to divide the inputted image into pixel groups; calculating a pixel group density for each of the divided pixel groups; and calculating an output value of a certain watched pixel based on an absolute density of the watched pixel and a relative density for the watched pixel, the relative density being calculated based on the pixel group density of the pixel group, to which the watched pixel belongs, and the pixel group density of the pixel group adjacent to the pixel group, to which the watched pixel belongs, among the pixel groups in the image.

BRIEF DESCRIPTION OF THE DRAWINGS

For a more complete understanding of the present invention and the advantages thereof, reference is now made to the following description taken in conjunction with the accompanying drawings.

FIG. 3 is a view showing a constitution of a function used in this system.

FIGS. 5(a) to 5(d) are views showing image histograms representing the functions used in this system shown in FIG. 3.

DESCRIPTION OF THE INVENTION

Figure 1:
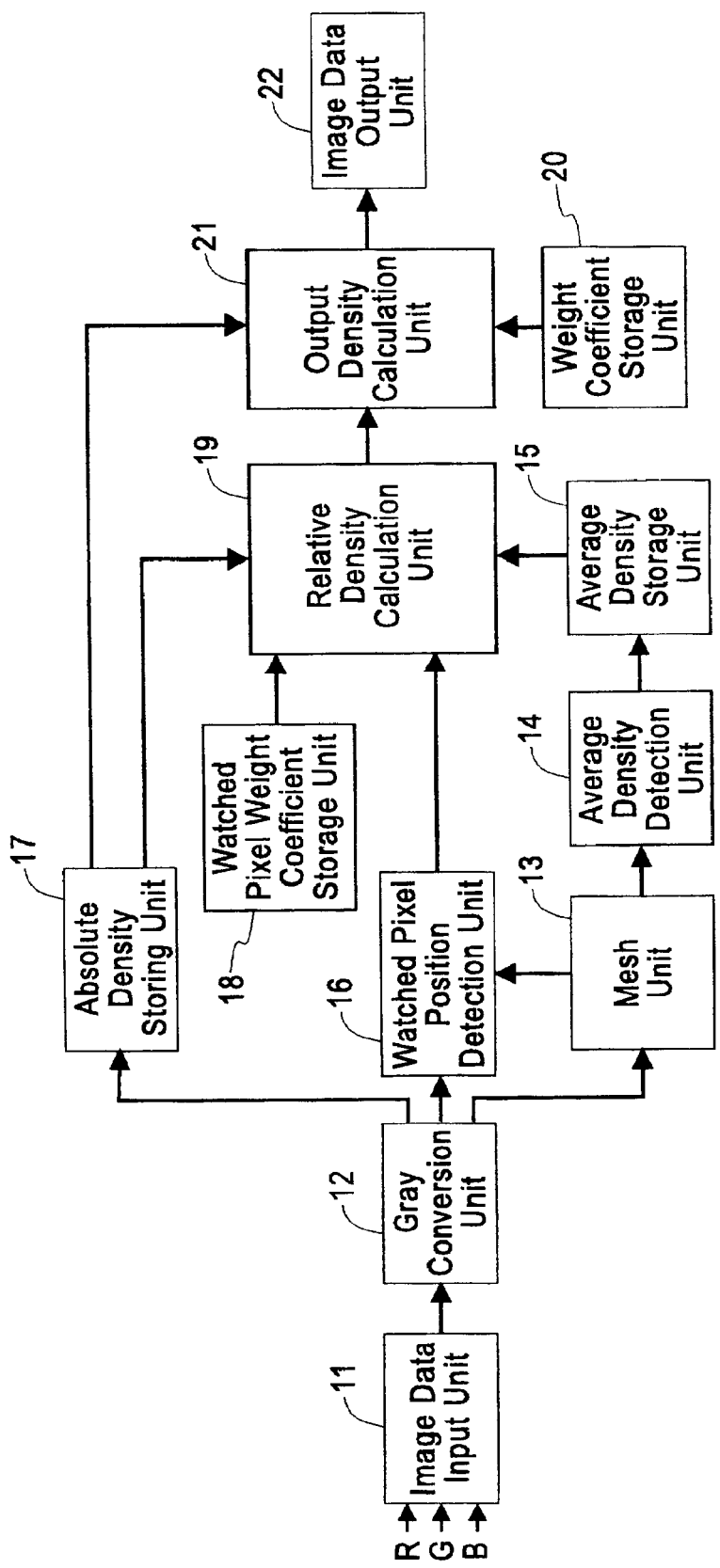
FIG. 1 is an explanatory view showing an entire constitution of an image processing apparatus according to this embodiment.

Herein, "pixel group density" is a concept including not only an average density of a pixel group described in the embodiment but also a density of a typical pixel, for example, a typical density in a pixel range having the largest number of pixels. In this case, the typical density is obtained by setting a specified number of density ranges and obtaining a number of pixels entering each of the ranges.

Herein, the relative density may be calculated by use of an influence degree calculated based on a distance from the watched pixel and the pixel group, to which the watched pixel belongs, to the pixel group adjacent to the pixel group, each of the adjacent pixel group being located on and under and at the right and left of the pixel group. Moreover, in the step of detecting the pixel group densities, an average density of the divided pixel group may be calculated, and the relative density may be calculated by multiplying the respective average densities of the pixel group, to which the watched pixel belongs, and of the pixel group adjacent to the pixel group, to which the watched pixel belongs, by the respective influence degrees. Furthermore, the relative density may be calculated based on an influence degree obtained by a trapezoidal function representing a positional relation between a coordinate position of the watched pixel and the pixel group adjacent to the pixel group, to which the watched pixel belongs. Conventionally, it has taken an enormous processing time to calculate an average density of a periphery of a pixel, for example, of the vicinity of N×N, for each pixel in which a relative density thereof is obtained. However, with the above-described constitution, it is possible to execute high-speed processing and to obtain an output image with a quality hardly deteriorated.

Moreover, if the output value is calculated only with the relative value, for example, it may sometimes occur that values in both an entirely bright portion and an entirely dark portion are equal to each other. In this case, an image of a bright portion may be black, and an image of a dark portion may be white. However, in the step of calculating this output value, the relative and absolute densities may be weighted to calculate the output value, thus it is possible to emphasize an object while maintaining a feature of an original image.

On the other hand, according to the present invention, a relative density detecting method for detecting a relative density of a watched pixel constituting an inputted image comprises the steps of: dividing the image into pixel groups, each of which has a specified size; detecting a pixel group density for each of the divided pixel groups; extracting positional information for the watched pixel in a pixel group including the watched pixel; and detecting a relative density of the watched pixel based on the pixel group density and the positional information.

Moreover, an absolute density of this watched pixel may be detected, and a relative density may be detected, which is obtained by adding a value obtained by multiplying a pixel group density by a weight of positional information to the detected absolute density. Thus, a step difference does not occur in a portion in which a density varies smoothly, and it is possible to represent a smooth density change in the output image.

Furthermore, a weight of this positional information may be calculated by applying a trapezoidal function representing a positional relation between a position coordinate of the watched pixel and the pixel group adjacent thereto to extract this positional information. In such a manner, simplifying of the calculation is enabled, and this is preferable in that a scale of image processing can be made small and a processing speed can be accelerated.

Moreover, in order to achieve the foregoing aspects, according to the present invention, an image processing apparatus comprises: pixel group dividing means for dividing an inputted image into pixel groups, each of which has a specified size; pixel group density detecting means for detecting a pixel group density for each of the pixel groups divided by the pixel group dividing means; weight deciding means for deciding each weight of the pixel groups adjacent to the pixel, to which a watched pixel belongs, based on a position of the watched pixel to be outputted; watched pixel density detecting means for detecting a density of the watched pixel; and relative density calculating means for calculating a relative density of the watched pixel based on a detected density of the watched pixel, a pixel group density of the detected pixel group and a decided weight of the pixel group.

Herein, the image processing apparatus may further comprise output density calculation means for calculating an output density by performing predetermined weighting for the density of the watched pixel detected by the watched pixel density detecting means and the relative density calculated by the relative density calculating means. With such a constitution, for example, by properly executing weighting based on the rule of thumb, emphasis of an object and outputting of a binarized image added properly with a feature of the original image are enabled.

Moreover, this pixel group dividing means may roundly divide an inputted image into meshes, each of which has I pixels×J pixels (I, J: integers). With such a constitution, this is preferable in that calculation for a background density can be executed at a high speed. Furthermore, this weight deciding means may comprise a table look-up for deciding weights of each pixel groups adjacent to a pixel group, to which the watched pixel belongs, based on a coordinate position of the watched pixel. In this case, specifically, the pixel groups are located at the right and left of the pixel group, to which the watched pixel belongs, and/or on and under the pixel group, to which the watched pixel belongs.

Still further, this weight deciding means may add weights of pixel groups located at the right and left of the pixel group and adjacent to the same, to which the watched pixel belongs, to obtain a sum of 1, and/or may add weights of pixel groups located on and under the pixel group and adjacent to the same, to which the watched pixel belongs, to obtain a sum of 1. With the above-described constitution, a simple function can be applied to the meshes located on and under and at the right and left of the pixel group, to which the watched pixel belongs, that is, adjacent thereto. Thus, it is possible to obtain a smooth and high-quality binarized image.

Furthermore, according to the present invention, an image processing apparatus for converting image data, which includes a specified object photographed by a digital camera, into a binarized image, may comprise: a meshing unit for meshing the entire image data into sub images; an average density detection unit for detecting an average density of each of the sub images meshed by the meshing unit; and a density detection unit for detecting a density of a pixel constituting the object. In this case, a binarized image, in which an outline of the object is emphasized, may be generated based on a detected density of the pixel, an average density of the sub image, to which the pixel belongs, and an average density of the sub image adjacent to the certain sub image. With such a constitution, it is possible to obtain a high-quality binarized image at a high speed, and even in the case of compressing an image size, it is possible to obtain a binarized image, which can bear comparison with the multi-valued image in readability of an object such as a character.

DETAILED DESCRIPTION OF THE ADVANTAGEOUS EMBODIMENT

An embodiment of the present invention will be described in detail with reference to the accompanying drawings below.

FIG. 1 is an explanatory view showing an entire constitution of the image processing apparatus according to this embodiment. This image processing apparatus can be constituted as software, for example, in a personal computer, or can be constituted as hardware or software, for example, in a digital camera. Moreover, this image processing apparatus can be applied as an apparatus of cutting out a character as pre-processing for a character recognition apparatus. A reference numeral 11 denotes an image data input unit for inputting color image data of R (red), G (green) and B (blue), and a numeral 12 denotes a gray conversion unit for converting color image data inputted from the image data input unit 11 into multi-valued gray image data. Image data inputted to this image data input unit 11 is, for example, image data read out from an optical image reading apparatus such as a picked-up image data with a digital camera, and image data read out from a scanner, which is equipped with a line sensor in a main scanning direction and scans an image in a sub scanning direction to read an image. In this gray conversion unit 12, the existing gray conversion system can be employed, in which, for example, each image data of R, G and B is subjected to gray conversion and the converted image data are added to convert the same into gray image data having 256 gray scales from 0 to 255 gray scales. Moreover, the image processing may be individually performed for each of color signals R, G and B to calculate output densities thereof, thus adding the converted image data finally. Furthermore, in the case where the gray image data rather than the color image data is inputted, the gray conversion unit 12 may be omitted, and the image processing may be performed based on this gray image data.

A reference numeral 13 denotes a meshing unit for meshing the gray image data (M pixels×N pixels) converted by the gray conversion unit 12 to sub images, each of which has I pixels×J pixels, for example, 10 pixels×10 pixels. A numeral 14 denotes an average density detection unit for obtaining an average density in each of the meshes (sub images) meshed by the meshing unit 13. A numeral 15 denotes an average density storage unit for respectively storing the average densities obtained by the average density detection unit 14. A numeral 16 is a watched pixel position detection unit for detecting that a watched pixel exists in a mesh located in an i-th column and an j-th row, for example, from a fact that the watched pixel is a pixel in m-th column and n-th row, or contents meshed by the meshing unit 13 and the like. A numeral 17 denotes an absolute density storage unit for storing a density (absolute density) of each of the pixels including the watched pixel.

A reference numeral 18 denotes a watched pixel weight coefficient storage unit for storing an influence degree (relative relation) for meshes located on and under and at the right and at the left of the watched pixel and at as a weight coefficient. For example, if the meshed sub image is constituted of 10 pixels×10 pixels, the weight coefficient is stored in a table of the watched pixel weight coefficient storage unit 18 as, for example, ten coefficients, that is, 0.05, 0.15 . . . 0.85, 0.95. A numeral 19 denotes a relative density calculation unit for calculating a relative density for each watched pixel in consideration of brightness in the periphery of the watched pixel based on each of the data from the average density storage unit 15 and the absolute density storage unit 17 and a weight coefficient read out from the watched pixel weight coefficient storage unit 18. A numeral 20 denotes a weight coefficient storage unit for storing weight values of the relative and absolute densities such as a value based on the rule of thumb, for example, that a weight of the absolute value is reduced to one-eighth. A numeral 21 denotes an output density calculation unit for calculating an output density from the relative density calculated by the relative density calculation unit 19 based on a weight obtained by the weight coefficient storage unit 20 and the absolute density of the watched pixel read out from the absolute density storage unit 17. A numeral 22 denotes an image data output unit for outputting an image having a final density calculated by the output density calculation unit 21 to a next step thereof such as a memory and printing devices.

Figure 2:
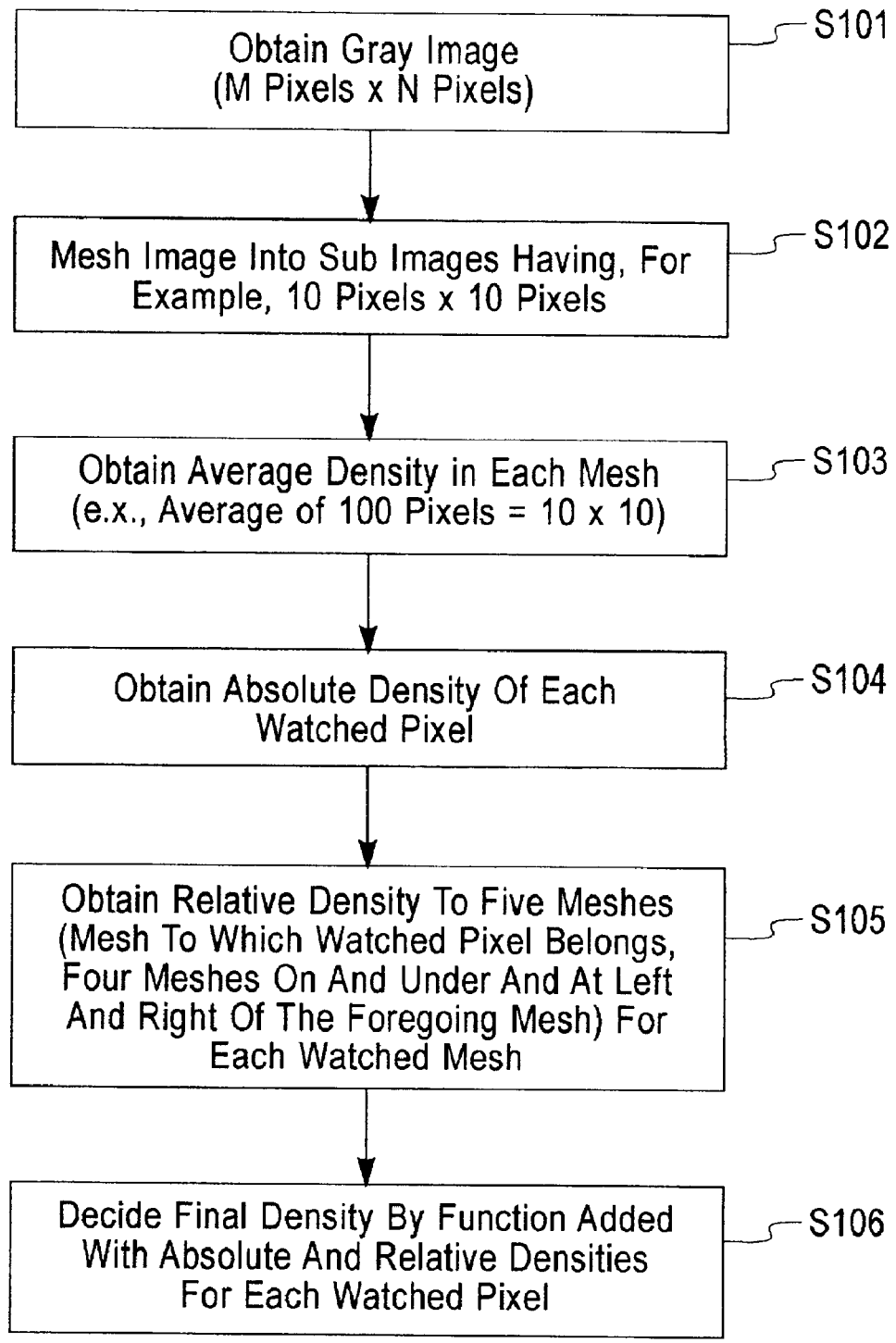
FIG. 2 is a flowchart explaining a processing flow of an image processing system according to this embodiment.

FIG. 2 is a flowchart explaining a processing flow of the image processing system according to this embodiment. First, from a result of the gray conversion unit 12 and the like, a gray image having M pixels×N pixels is obtained (step 101). This obtained gray image is meshed into sub images having, for example, 10 pixels×10 pixels, to form I×J meshes (pixel group) (step 102). Next, an average density in each of the meshes is obtained. (step 103). For example, if the gray image is meshed into 10 pixels×10 pixels, an average value (density) of 100 pixels (=10 pixels×10 pixels) is calculated. Then, an absolute density of each watched pixel is obtained (step 104), and by using this absolute density, a relative density to five meshes (mesh including watched pixel itself, two meshes on and under the center mesh and two meshes at the right and left of the center mesh) is obtained for each watched pixel (step 105). Thereafter a final density is decided by a function added with the absolute and relative densities for each watched pixel (step 106).

Next, description will be made in detail for a function used in this system.

FIG. 3 shows a constitution of the function used in this system. [P]mn shows a final value (density) of a pixel located in the m-th column and the n-th row. This final value is schematically calculated from a value added with a constant C, a value added with the absolute value and a value added with the relative value. Specifically, in an equation shown in FIG. 3, a first term of a right side thereof represents a constant term, a second term thereof represents the one obtained by multiplying the absolute value by α, and a third term thereof represents the one obtained by multiplying the relative value by β. This third term of the right side is added with a relative value given in consideration of a mesh itself (in an i-th column and a j-th row) and meshes on and under the mesh and a relative value given in consideration of the mesh itself and two meshes at the right and left sides. Herein, if the final value is decided only with the relative values, for example, it may sometimes occur that values in both an entirely bright portion and an entirely dark portion are equal to each other. Thus, there exists a possibility of a result which is occurred to be a different image from an actual image. For example, an image of a bright portion may be black, and an image of a dark portion may be white. For this reason, this system is constituted such that the final value can be decided by adding the absolute value. Moreover, the absolute value Pmn of the watched pixel is multiplied by the weight coefficient α. In this case, experientially, the value α is preferably reduced to about one-eighth. Furthermore, the final value may sometimes fall in a minus if the absolute value is made small when the final value is calculated with the relative value. Therefore, as the constant C, a value, which is decided experientially so that the final value is not to fall in a minus, is employed. Note that in this function, an average density of a mesh image in the i-th column and the j-th row, to which the watched pixel belongs, is represented as $S_{i,j}$, an average density of a mesh image located thereon is represented as $S_{i,-1,j}$, an average density of a mesh image located thereunder is represented as $S_{1+1,j}$, an average density of a mesh image located at the left thereof is represented as $S_{i,j-1}$, and an average density of a mesh image located at the right thereof is represented as $S_{i,j+1}$. Furthermore, a weight coefficient of the mesh on the watched pixel is represented as $d_1$, a weight coefficient of the mesh at the left thereof is represented as $d_2$, a weight coefficient of the mesh at the right thereof is represented as $d_3$, and a weight coefficient of the mesh thereunder is represented as $d_4$.

In this function shown in FIG. 3, for example, parameters may be designated as follows:

In the original image: C=0, α=1, β=0;
in the image only having the relative value:
 C=plus value, α=0, β=plus value; and
in the image added with the absolute value and the relative value:
 C=plus value, α=plus value, β=plus value.

With the above designation of the parameters, various images including an image enlarged in contrast can be formed at a high speed.

Figure 4A:
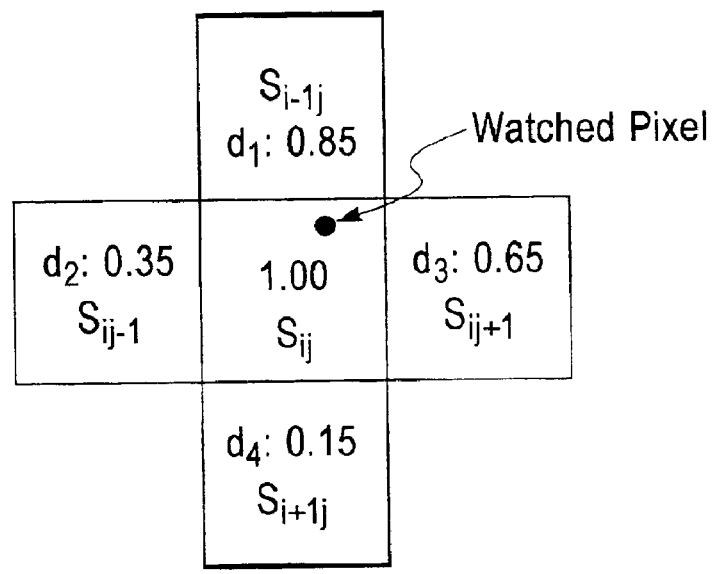
FIGS. 4(a) and 4(b) are views respectively showing an idea when obtaining a relative value and a trapezoidal function when obtaining a weight coefficient.
Figure 4B:
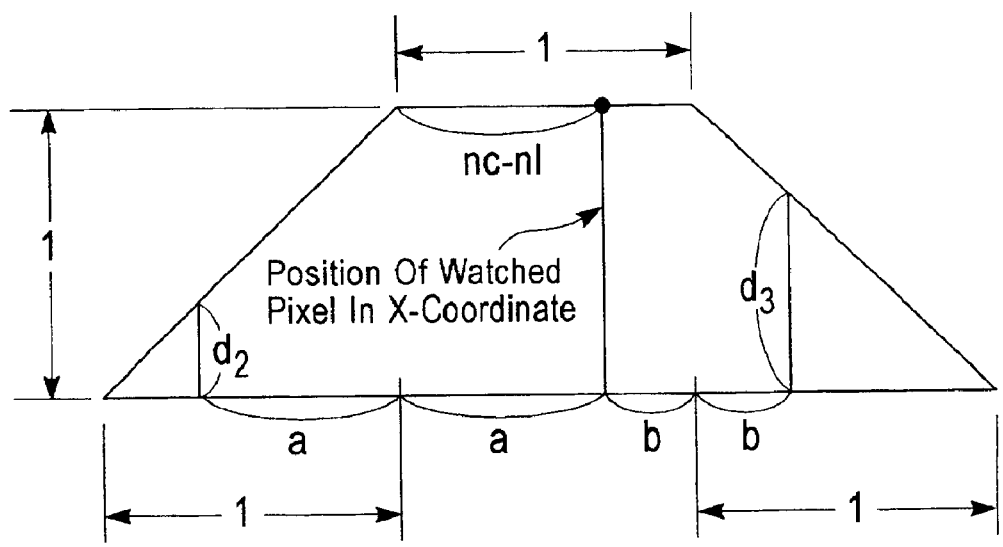

FIGS. 4(a) and 4(b) are views respectively showing an idea when obtaining the relative value and a trapezoidal function when obtaining the weight coefficient. In FIG. 4(a), as explained with reference to FIG. 3, an average density of a mesh image in the i-th column and the j-th row, to which the watched pixel belongs, is represented as $S_{i,j}$, an average density of a mesh image located thereon is represented as $S_{i-1,j}$, an average density of a mesh image located thereunder is represented as $S_{i+1,j}$, an average density of a mesh image located at the left thereof is represented as $S_{i,j-1}$, and an average density of a mesh image located at the right thereof is represented as $S_{i,j+1}$. In this example, the watched pixel is located at the upper right position in the mesh image in the i-th column and the j-th row. The influence degrees (weights) received from the mesh images by the watched pixel are as follows. The weight is 1 in the mesh in the i-th column and the j-th row. Since the watched pixel is located close to the mesh located on the mesh, to which the watched pixel belongs, the weight $d_1$ is equal to 0.85 in the mesh in the i-th column and the j-th row. The weight $d_4$ is equal to 0.15 in the mesh thereunder. The weight $d_2$ is equal to 0.35 in the mesh at the left thereof. The weight $d_3$ is equal to 0.65 in the mesh at the right thereof. Herein, $d_1+d_4=1$ and $d_2+d_3=1$, and the mesh has 10 pixels×10 pixels. Therefore, in consideration of the centers of the respective pixels, the respective weight values can take ten values as described above, that is, 0.05, 0.15, . . . 0.85 and 0.95.

The relation of the weight coefficients when obtaining the relative value can be easily explained with reference to the trapezoidal function shown in FIG. 4(b). In FIG. 4(b), an example of obtaining the weights of the mesh images located at the right and left of the mesh, to which the watched pixel belongs, by use of the positional relation in the X-coordinate is illustrated. The upper side of this trapezoidal function shows a position of the sub area (mesh image) in the i-th column and the j-th row in which the watched pixel exists, and a length thereof is 1. The hypotenuses slant from both ends of the upper side downward to the right and left directions have a slant, which has a width of 1 and a height of 1.

Now, the X-coordinate of the watched pixel is assumed as nc, the X-coordinate of the left end of the watched pixel in the mesh is assumed as nl (X-coordinate of the pixel at the left end in the mesh-0.5), and the size of the mesh image is assumed as Sz. In this case, for example, the weight coefficient $d_2$ of the mesh at the left of the mesh in the i-th column and the j-th row and the weight coefficient $d_3$ of the mesh at the right of the mesh in the i-th column and the j-th row can be obtained in the following equations.

$$d_2 = 1(nc-nl)/Sz$$

$$d_3 = (nc-nl)/Sz$$

Results obtained from the above equations can be also obtained from the trapezoidal function shown in FIG. 4(b), that is, $d_2$ can be obtained from the left hypotenuse and $d_3$ can be obtained from the right hypotenuse. Note that, similarly to the above, the weight coefficients $d_1$ and $d_4$ of the mesh images on and under the center mesh can be obtained from the positional relation of the Y-coordinate.

In the foregoing manner, the weight coefficients are previously calculated in this embodiment, and can be easily obtained by a table look-up while calculating [P]mn. By obtaining the weight coefficients with the above-described system, background values as bases for comparison among the respective pixels at the positions in the meshes can be made to differ delicately from one to another, thus it is possible to obtain a smooth image without suddenly bringing about a great change of the image at a boundary of the meshes.

Note that although the average density of the four mesh images located on and under and at the right and left of the mesh in the i-th column and the j-th row is used as the relative density of the meshes adjacent to each other, the average density of the slant images may be further added as long as the processing is permitted to fall a little complicated.

FIGS. 5(a) to 5(d) are views showing image histograms representing the functions used in this system shown in FIG.

3. FIG. 5(a) shows an original histogram. FIG. 5(b) shows a histogram where the absolute value in the original histogram of FIG. 5(a) is multiplied by α (herein, by ⅛). FIG. 5(c) is a histogram where the relative value obtained by the algorithm as described above is added to the histogram of FIG. 5(b). Under the condition that the relative value is simply added, the histogram may include a minus value in some cases. Therefore, in this embodiment, the constant C is added as shown in FIG. 5(d) to jack up the histogram, thus adjusting an output value.

Next, description will be further made for this embodiment with reference to output examples.

FIG. 6(a) and 6(b) and FIGS. 7(a) and 7(b) show examples of image processing performed for images of time tables photographed by a digital camera. Note that in these views, there appear images, which are against the present applicant's will due to conversion at the time of filing the present invention. Herein, the parameters of the function shown in FIG. 3 are set as follows.

$$\text{constant } C=64, \alpha=\tfrac{1}{8}, \beta=1$$

Figure 6A:
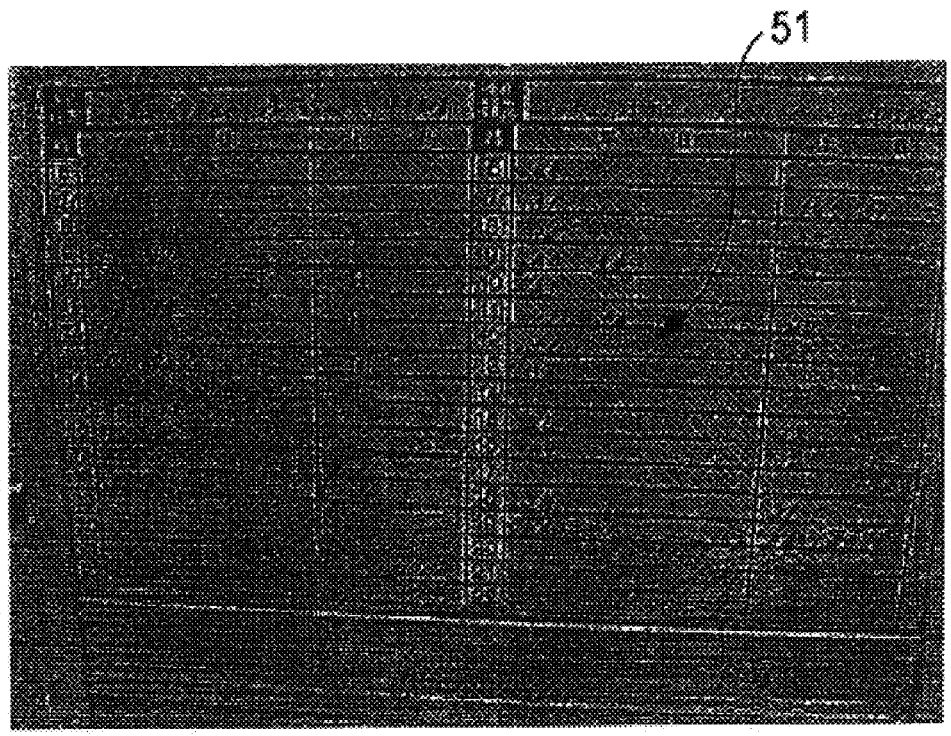
FIGS. 6(a) and 6(b) are views showing examples of image processing performed for images of time tables photographed by a digital camera.
Figure 6B:
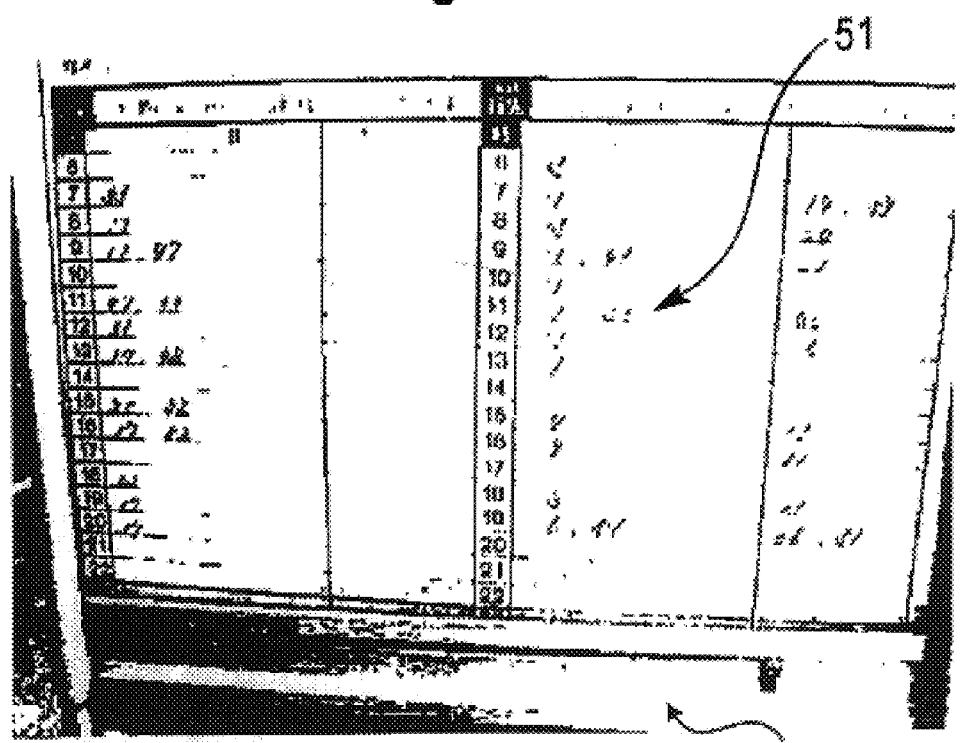
Figure 7A:
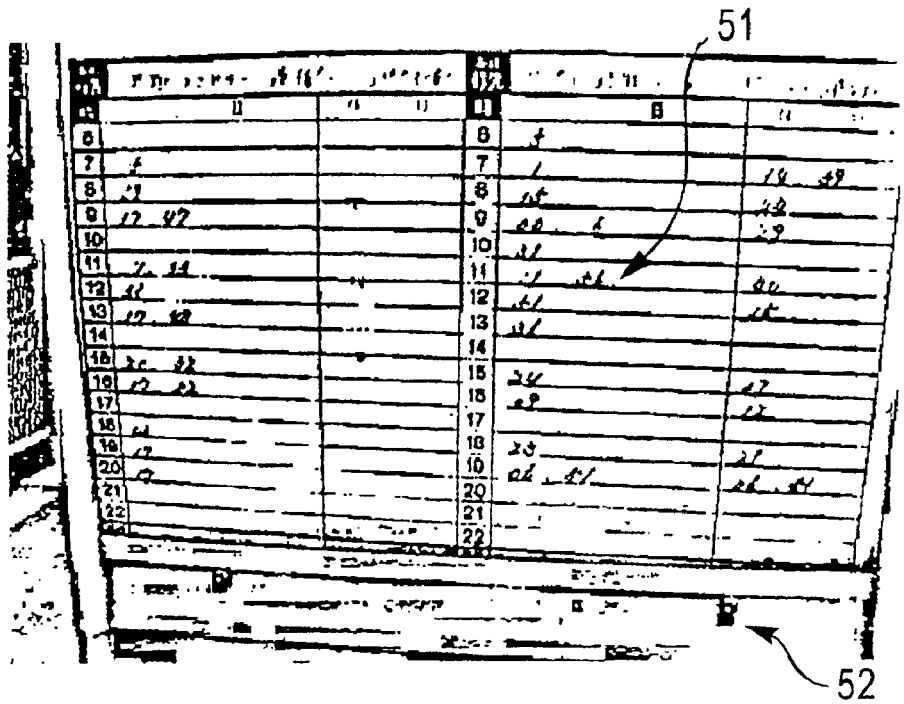
FIGS. 7(a) and 7(b) are views showing examples of image processing performed for the images of the time tables photographed by a digital camera.
Figure 7B:
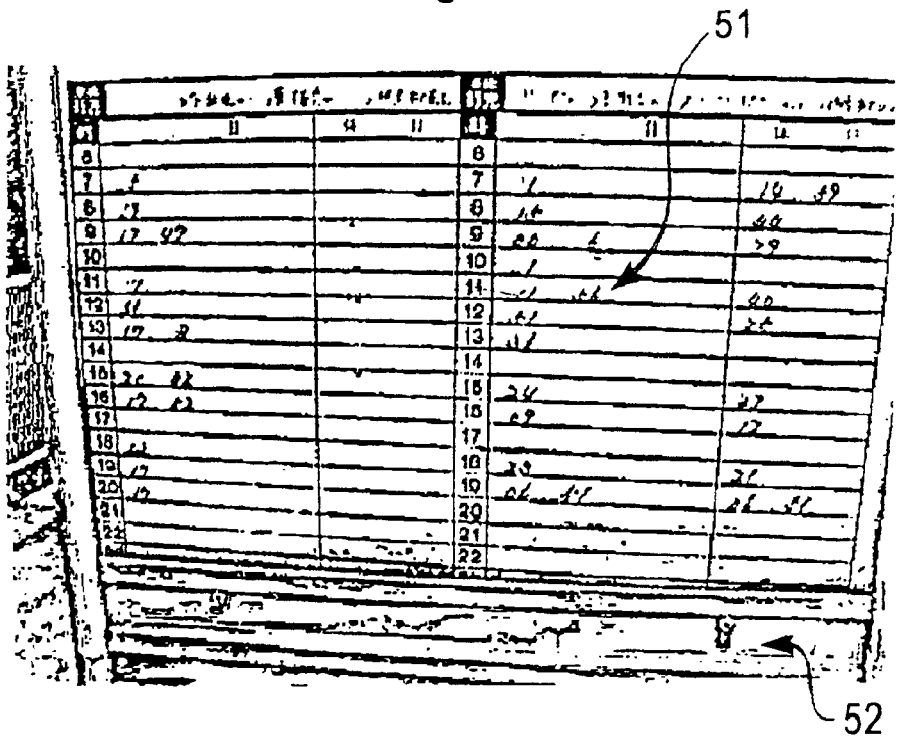

And the mesh size is set as Sz=8. FIG. 6(a) shows an image obtained by printing an 8-bit multi-valued image so as to have high image quality as possible by a printer driver. From this image, it is possible to read time data such as a character 51 and the like. However, a data volume thereof is 51.5 kB (tif file compressed with JPEG), which is considerably large. FIG. 6(b) shows an image obtained by subjecting the original image to the conventional simple binarization. In this case, a data volume thereof is reduced to 5.0 kB (tif file compressed with G4MMR), which is small. However, in this case, there are many characters, which can not be read. For example, it is difficult to determine the character 51. Moreover, a background 52 also appears differently from an actual image thereof to a great extent. On the other hand, FIG. 7(a) shows a binarized image obtained by performing relative value calculation thereto not by use of the above-described trapezoidal function but by use only of the mesh, to which the watched pixel belongs. In this case, a data volume thereof is 7.7 kB (G4MMR), which is small, and it is possible to read the character 51 precisely. Moreover, a background 52 expresses a feature of an actual image thereof. However, the background 52 is affected by the influence of the boundary of the meshes, hence there are some places where unnatural ruggedness occurs. FIG. 7(b) shows a binarized image obtained by further performing relative value calculation by use of slope functions of the trapezoids located on and under and at the right and left of the certain mesh. Herein, a data volume thereof is 9.7 kB (G4MMR), which is small. Moreover, ruggedness on the background 52 disappears, hence a considerably natural binarized image is achieved. Furthermore, it is possible to determine the character 51 sufficiently. Accordingly, obtained readability of the character 51 can even bear comparison with the multi-valued image shown in FIG. 6(a).

Figure 8A:
FIGS. 8(a) and 8(b) are views showing examples of image processing performed for photographs of a dining table taken by a digital camera.
Figure 8B:
Figure 9:
FIG. 9 is a view showing an example of image processing performed for the photograph of the dining table taken by a digital camera.

FIGS. 8(a) and 8(b) and FIG. 9 are views showing examples of image processing performed for photographs of a dining table taken by a digital camera. Note that, also in these views, there appear images, which are against the present applicant's will due to conversion at the time of filing the present invention. FIG. 8(a) is a binarized image obtained by processing the taken image into 8-bit multi-valued image and then subjecting the 8-bit multivalued image to an error diffusion method as a prior art. In this case, an image size thereof is 62.0 kB (G4MMR), which is large. FIG. 8(b) shows an image obtained by subjecting the image of FIG. 8(a) to the simple binarization. In this case, an image size thereof is 5.7 kB (G4MMR), which is small. However, the image is greatly defaced, and it is hardly possible to determine an outline thereof. On the other hand, FIG. 9 shows an image subjected to image processing with the system according to this embodiment. In this case, an image size thereof is 15.0 kB (G4MMR), which is relatively small. Moreover, it is possible to clearly express existence of objects. Accordingly, an artistic image can be obtained, and it is possible to utilize the image as a rough copy for a woodcut print.

As described above, with the image processing method according to this embodiment, image processing is performed by properly combining the absolute value and the relative value, thus the image processing method can be used for various purposes such as pre-processing for cutting out an object including a character, storing memo data on a white board, a time table of a bus service and the like, making a rough copy for a woodcut print. With the image processing method, extraction of a character can be achieved with a high quality. Accordingly, it is possible to apply the image processing method, for example, to pre-processing for an automatic reading system of postal matters' addresses. Moreover, with this image processing method, it is possible to reduce an image size to about ⅕ compared with that of the 8-bit multi-valued image. Accordingly, a great effect can be obtained, for example, in the case where a large amount of images photographed by a digital camera are desired to be stored. Furthermore, since the image processing method is realized by use of a simple function, the image processing can be carried out at a high speed, and nevertheless, a binarized image having a high quality can be obtained.

Moreover, there may be provided a user interface for allowing the equation shown in FIG. 3 to change. Thus, adjustment can be performed so as to correspond to a characteristic of an image to be processed, for example, an image having overall a small (or large) contrast, an image having a character or an object desired to be determined, which has an outline and the like close to (or sufficiently different from) a background thereof in density, and an image where black dots such as noises appeared on the surface of an object are apt to appear, the noise being occurred by an influence of the object or the background and not being desired by a user. Moreover, adjustment can be performed reflecting an effect intended by a user.

For example, the equation of FIG. 3 is assumed to be further converted as follows.

$$[P]mn = C + (\alpha+\beta) Pmn - \beta(nS_{ij} + d_1 S_{i-1j} + d_4 S_{i+1j} + d_2 S_{ij-1} + d_3 S_{ij+1})/(n+2)$$

First, by changing the value C, brightness (density) of the overall image can be changed. Moreover, by changing the value α to a sufficiently larger value in comparison with the value β, an image closer to the simply binarized images shown in FIG. 6(b) and FIG. 8(b) can also be obtained. Then, by changing the value n, the influence given to the relative value between the mesh including the watched pixel and the meshes adjacent thereto can be changed.

Furthermore, by reducing the mesh itself in size, the image is apt to be affected by the influence of the density change of the fine portions thereof. Accordingly, the image made to reflect the patterns and the like of the fine portions generated depending on a material of the object can be obtained.

Moreover, in the advantageous embodiment of the present invention, the influence degree of the meshes adjacent to each other has been described with reference to the linear function inversely proportional to the distance of the adjacent meshes and the watched pixel. However, the influence degree can be calculated with reference to other functions such as the multidimensional function and the trigonometric function.

As described above, according to the present invention, it is possible to cut out a character and the like at a high speed, which are written with a pen and so on the character being relatively darker than a background in a multi-valued image, to use the cutting-out of a character for preprocessing for character recognition and the like, to emphasize an object such as a character and a figure, and to compress an image size without damaging understandability of the object.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Thus, although the advantageous embodiments of the present invention have been described in detail, it should be understood that various changes, substitutions and alternations can be made therein without departing from spirit and scope of the invention as defined by the appended claims.

What is claimed is:

1. An image processing method comprising the steps of:
   dividing an inputted image into pixel groups, each of which has a specified size;
   calculating a pixel group density for each of the divided pixel groups;
   calculating an output value of a certain watched pixel based on an absolute density of the watched pixel and a relative density for the watched pixel, the relative density being calculated based on the pixel group density of the pixel group, to which the watched pixel belongs, and the pixel group density of the pixel group adjacent to the pixel group, to which the watched pixel belongs, among the pixel groups in the image; and
   wherein the relative density is calculated based on an influence degree obtained by a trapezoidal function representing a positional relation between a coordinate position of the watched pixel and the pixel group adjacent to the pixel group, to which the watched pixel belongs.

2. The image processing method according to claim 1, wherein the step of dividing an inputted image into the pixel groups is meshing the image into sub images, each of which has a rectangular area.

3. The image processing method according to claim 1, wherein the relative density is calculated by use of an influence degree calculated based on a distance from the watch pixel and the pixel group, to which the watched pixel belongs, to the pixel group adjacent to the pixel group, each of the adjacent pixel group being located on and under and at the right and left of the pixel group.

4. The image processing method according to claim 3, wherein in the step of calculating the pixel group densities, an average density of the divided pixel group is calculated, and
   the relative density is obtained by multiplying the respective average densities of the pixel group, to which the watched pixel belongs, and of the pixel group adjacent to the pixel group, to which the watched pixel belongs, by the respective influence degrees.

5. The image processing method according to claim 1, wherein in the step of calculating an output value, the relative and absolute densities are weighted to calculate the output value.

6. An article of manufacture comprising a computer usable medium having computer readable program code means embodied therein for causing image processing, the computer readable program code means in said article of manufacture comprising computer readable program code means for causing a computer to effect the steps of claim 1.

7. A program storage device readable by machine, tangibly embodying a program of instructions executable by the machine to perform method steps for causing image processing, said method steps comprising the steps of claim 1.

8. A relative density detecting method for detecting a relative density of a watched pixel constituting an inputted image, comprising the steps of:
   dividing the image into pixel groups, each of which has a specified size;
   detecting a pixel group density for each of the divided pixel groups;
   extracting positional information for the watched pixel in a pixel group including the watched pixel; and
   detecting a relative density of the watched pixel based on an influence degree obtained by a trapezoidal function representing a positional relation between a coordinate position of the watched pixel and the pixel group adjacent to the pixel group, to which the watched pixel belongs.

9. An article of manufacture comprising a computer usable medium having computer readable program code means embodied therein for causing relative density detection, the computer readable program code means in said article of manufacture comprising computer readable program code means for causing a computer to effect the steps of claim.

10. A program storage device readable by machine, tangibly embodying a program of instructions executable by the machine to perform method steps for causing relative density detection, said method steps comprising the steps of claim 8.

11. An image processing apparatus comprising:

pixel group dividing means for dividing an inputted image into pixel groups, each of which has a specified size;

pixel group density detecting means for detecting a pixel group density for each of the pixel groups divided by the pixel group dividing means;

weight deciding means for deciding each weight of the pixel groups adjacent to the pixel, to which a watched pixel belongs, based on a position of the watched pixel to be outputted;

watched pixel density detecting means for detecting a density of the watched pixel;

relative density calculating means for calculating a relative density of the watched pixel based on a detected density of the watched pixel, a pixel group density of the detected pixel group and a decided weight of the pixel group; and wherein the weight deciding means adds weights of pixel groups adjacent to a pixel group, to which the watched pixel belongs, to obtain a sum of 1, the pixel groups being located at the right and left of the pixel group, to which the watched pixel belongs, and/or adds weights of pixel groups adjacent to a pixel group, to which the watched pixel belongs, to obtain a sum of 1, the pixel groups being located on and under the pixel group, to which the watched pixel belongs.

12. The image processing apparatus according to claim 11, further comprising:

output density calculation means for calculating an output density by weighting the density of the watched pixel detected by the watched pixel density detecting means and the relative density calculated by the relative density calculating means.

13. The image processing apparatus according to claim 11, wherein the pixel group dividing means roundly divides an inputted image into meshes, each of which has I pixels×J pixels (I, J: integers).

14. The image processing apparatus according to claim 11, wherein the weight deciding means comprises a table look-up for deciding weights of pixel groups adjacent to a pixel group, to which the watched pixel belongs, based on a coordinate position of the watched pixel, the pixel groups being located at the right and left of the pixel group, to which the watched pixel belongs, and/or on and under the pixel group, to which the watched pixel belongs.

15. A computer program product comprising a computer usable medium having computer readable program code means embodied therein for causing image processing, the computer readable program code means in said computer program product comprising computer readable program code means for causing a computer to effect the apparatus of claim 11.

16. An image processing apparatus for converting image data, which includes a specified object photographed by a digital camera, into a binarized image, comprising:

a meshing unit for meshing the entire image data into sub images;

an average density detection unit for detecting an average density of each of the sub images meshed by the meshing unit; and a density detection unit for detecting a density of a pixel constituting the object, wherein a binarized image, in which an outline of the abject is emphasized, is generated based on a detected density of the pixel, an average density of the sub image, to which the pixel belongs, and an average density of the sub image adjacent to the certain sub image, the density detection unit configured to adds weights of sub images adjacent to a sub image, to which the pixel belongs, to obtain a sum of 1.

* * * * *

UNITED STATES PATENT AND TRADEMARK OFFICE
CERTIFICATE OF CORRECTION

PATENT NO. : 6,985,629 B2
DATED : January 10, 2006
INVENTOR(S) : Hiroyasu Takahashi It is certified that error appears in the above-identified patent and that said Letters Patent is hereby corrected as shown below:

<u>Column 12,</u>
Line 67, "claim" should be -- claim 8 --.

<u>Column 14,</u>
Line 34, "abject" should be -- object --.

Signed and Sealed this

Twenty-eighth Day of March, 2006

JON W. DUDAS
*Director of the United States Patent and Trademark Office*